US011930279B2

(12) United States Patent
Yap et al.

(10) Patent No.: US 11,930,279 B2
(45) Date of Patent: Mar. 12, 2024

(54) SYSTEM AND METHOD TO GENERATE EMBEDDED FILL LIGHT FUNCTION IN DISPLAY DEVICES

(71) Applicant: Dell Products, L.P., Round Rock, TX (US)

(72) Inventors: Eng Cheng Vincent Yap, Singapore (SG); Lei Guo, Singapore (SG); Bee June Tye, Singapore (SG)

(73) Assignee: Dell Products, L.P., Round Rock, TX (US)

( * ) Notice: Subject to any disclaimer, the term of this patent is extended or adjusted under 35 U.S.C. 154(b) by 178 days.

(21) Appl. No.: 17/650,736

(22) Filed: Feb. 11, 2022

(65) Prior Publication Data

US 2023/0262340 A1 Aug. 17, 2023

(51) Int. Cl.
| | |
|---|---|
| H04N 23/74 | (2023.01) |
| G06F 1/16 | (2006.01) |
| G09G 5/02 | (2006.01) |
| G09G 5/10 | (2006.01) |
| H04L 65/1083 | (2022.01) |
| H04L 65/403 | (2022.01) |

(52) U.S. Cl.
CPC .......... *H04N 23/74* (2023.01); *G06F 1/1686* (2013.01); *G09G 5/02* (2013.01); *G09G 5/10* (2013.01); *H04L 65/1083* (2013.01); *H04L 65/403* (2013.01); *G09G 2320/0626* (2013.01); *G09G 2354/00* (2013.01)

(58) Field of Classification Search
CPC .......... H04N 23/74; G06F 1/686; G09G 5/02; G09G 5/10; H04L 65/1083; H04L 65/403
See application file for complete search history.

(56) References Cited

U.S. PATENT DOCUMENTS

| | | | | |
|---|---|---|---|---|
| 10,277,829 | B1 * | 4/2019 | Garrido | H04N 23/63 |
| 2022/0159166 | A1 * | 5/2022 | Files | H04N 23/74 |
| 2023/0085287 | A1 * | 3/2023 | Holmes | G06V 20/40 |
| | | | | 348/370 |

* cited by examiner

*Primary Examiner* — Olisa Anwah
(74) *Attorney, Agent, or Firm* — Fogarty LLP

(57) ABSTRACT

System and method for providing fill light on a display of an Information Handling System (IHS) are described. In some embodiments, the IHS may include a processor and a memory coupled to the processor, the memory having program instructions stored thereon that, upon execution by the processor, cause the IHS to: generate, using a camera configured on a display of an Information Handling System (IHS), a first video feed signal of a user positioned in front of the display, and generate an image on the display, the image comprising a first region and a second region, the first region configured to display a second video feed signal from the IHS, the second region configured to generate fill light for enhancing a luminescence of the user.

18 Claims, 8 Drawing Sheets

| Back | Auto Mode | Easy Arrange | Input Manager | Options |

Configure

☐ PowerNap options:
◉ Reduce brightness when screensaver activates
○ Put the display to sleep when screensaver activates Program shortcut key:
[Ctrl + Shift + D]

Easy Arrange MRU shortcut key:
[Ctrl + Shift + Home]

P2P position shortcut key:
[None]

Application Window shortcut key:
[Ctrl + Shift + Num 0]

Fill-Light-Zone Brightness shortcut key:
[Ctrl + Shift + B] — 512

Fill-Light position shortcut key:
[Ctrl + Shift + Home] — 514

Fill-Light effect shortcut key:
[Ctrl + Shift + E] — 516

☐ Auto switch USB upstream ports in PEP side by mode

SYSTEM AND METHOD TO GENERATE EMBEDDED FILL LIGHT FUNCTION IN DISPLAY DEVICES

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Many IHSs are equipped with a front-facing camera for capturing images of users positioned in front of a display of the IHS. The front-facing camera has enabled videoconferencing, and other camera-based video applications, such as video (vLogging), which could be considered to be one of the fastest growing segments of the computer industry. In many cases, digital video cameras, also known as webcams, have been integrated with personal computers in which the webcams in conjunction with their displays enable users to videoconference from a variety of locations (e.g., office, home, travel, etc.). These webcams may also be relatively small cameras that are coupled to an IHS through a link, such as a USB cable. Such webcams can be used to conduct a video session with others over the Internet. The maximum resolution of webcams is typically lower than that of many handheld video cameras. Nevertheless, video sessions are conducted over the Internet at a relatively low resolution thus enabling webcams to be relatively inexpensive compared to most video cameras.

SUMMARY

System and method for providing fill light on a display of an Information Handling System (IHS) are described. In some embodiments, the IHS may include a processor and a memory coupled to the processor, the memory having program instructions stored thereon that, upon execution by the processor, cause the IHS to: generate, using a camera configured on a display of an Information Handling System (IHS), a first video feed signal of a user positioned in front of the display, and generate an image on the display, the image comprising a first region and a second region, the first region configured to display a second video feed signal from the IHS, the second region configured to generate fill light for enhancing a luminescence of the user.

According to another embodiment, a fill light generating method includes the steps of generating, using a camera configured on a display of an Information Handling System (IHS), a first video feed signal of a user positioned in front of the display, and generating an image on the display in which the image includes a first region and a second region. The first region displays a second video feed signal from the IHS, while the second region generating fill light for enhancing a luminescence of the user.

According to yet another embodiment, a hardware memory device has program instructions stored thereon for execution by a processor of an Information Handling System (HS). The instructions, when executed, cause the HS to generate, using a camera configured on a display of an Information Handling System (IHS), a first video feed signal of a user positioned in front of the display. The instructions also cause the IHS to generate an image on a display of an Information Handling System (IHS), the image comprising a first region and a second region, the first region configured to display a second video feed signal from the IHS, the second region configured to generate fill light for enhancing a luminescence of the user

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

FIGS. 5A and 5B illustrate two example user input screens that may be generated by the fill light generating system to receive user input for adjusting how the fill light regions are displayed on the display according to one embodiment of the present disclosure.

DETAILED DESCRIPTION

Figure 1A:
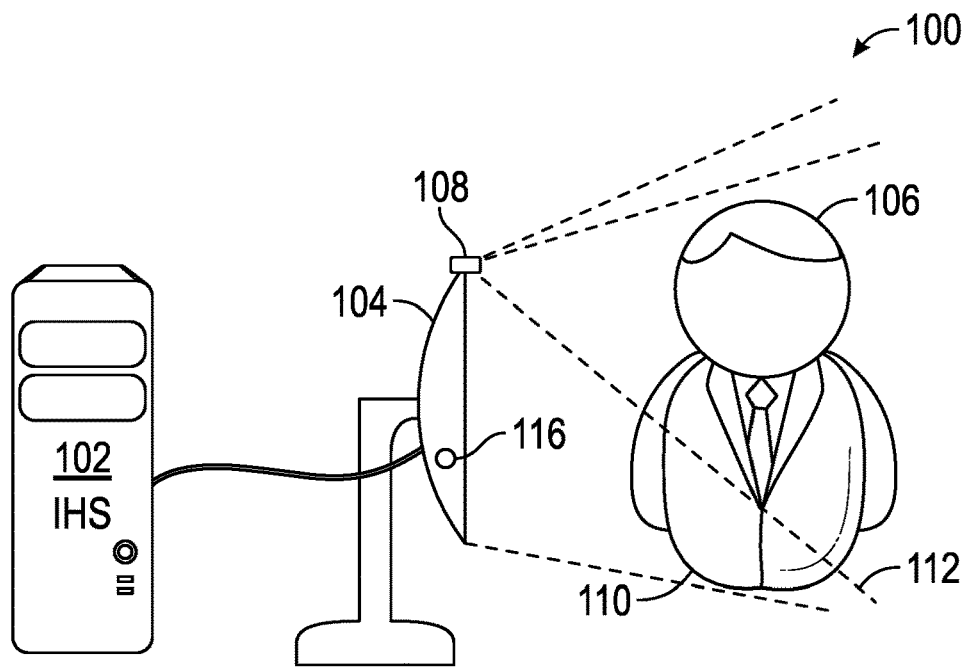
FIGS. 1A, 1B, and 1C illustrate an example fill light generating system according to one embodiment of the present disclosure.

Embodiments of the present disclosure provide a fill light generating system and method that uses a display of an Information Handling System (IHS) to generate fill light for illuminating a user. Whereas conventional cameras configured on IHSs have required ancillary lighting sources when ambient lighting conditions are poor, such lighting sources have been cumbersome and relatively difficult to configure properly. Embodiments of the present disclosure provide a solution to this problem, among others, by generating a fill light region of a display of the IHS that imparts light onto a user using a technique that, in many cases, may not require additional, dedicated lighting sources for sufficiently illuminating the user.

Webcast usage has increased significantly, particularly due to the acceptance of working from home, which has become a new norm for many working professionals. Fill lights have, in many respects, become essential for improving video lighting conditions for users, such as video loggers (vloggers) and video conferencing participants in cases where the ambient lighting may be less than ideal. Conventionally, fill lighting has been achieved by using external lighting. But such external lighting adds costs, requires additional effort to setup, uses external cabling that can become bothersome, and takes up space.

Cameras use an electronic image sensor to generate images. When low lighting conditions exist, however, the quality of the generated images are often compromised. This is mainly due to the level of available light for generating an image being reduced relative to noise inherent in the system, thus yielding a relatively poor signal-to-noise (SNR) ratio. Thus, improving the SNR is often achieved by artificial lighting (e.g., fill lighting) when poor ambient lighting conditions exist.

The amount of light incident on an object is referred to illuminance, which is the total luminous flux incident on a surface per unit area. It is a measure of how much the incident light illuminates the object, wavelength-weighted by the luminosity function to correlate with human brightness perception. Illuminance may be measured in Lux, which is a value of luminous flux per unit area. A camera can require a minimum level of illuminance to achieve acceptable image quality. If the subject illuminance is low, the SNR will be low, and the image quality will be insufficient. Thus, it would be advantageous to provide an object illuminance that results in a SNR that is above the level necessary to provide an image of acceptable quality.

In many cases, digital video cameras, also known as webcams, have been integrated with personal computers and their displays to enable users to videoconference from a variety of locations (e.g., office, home, travel, etc.). Nevertheless, each location has its own unique lighting conditions, which may not be ideal for capturing quality digital images. This has been due to the fact that, while cameras capture images by recording light reflected from a subject, it is still important for the subject to be adequately illuminated so that a sufficient amount of light is reflected into the camera. It is with these issues in mind that embodiments of the present disclosure are described herein.

Figure 1B:
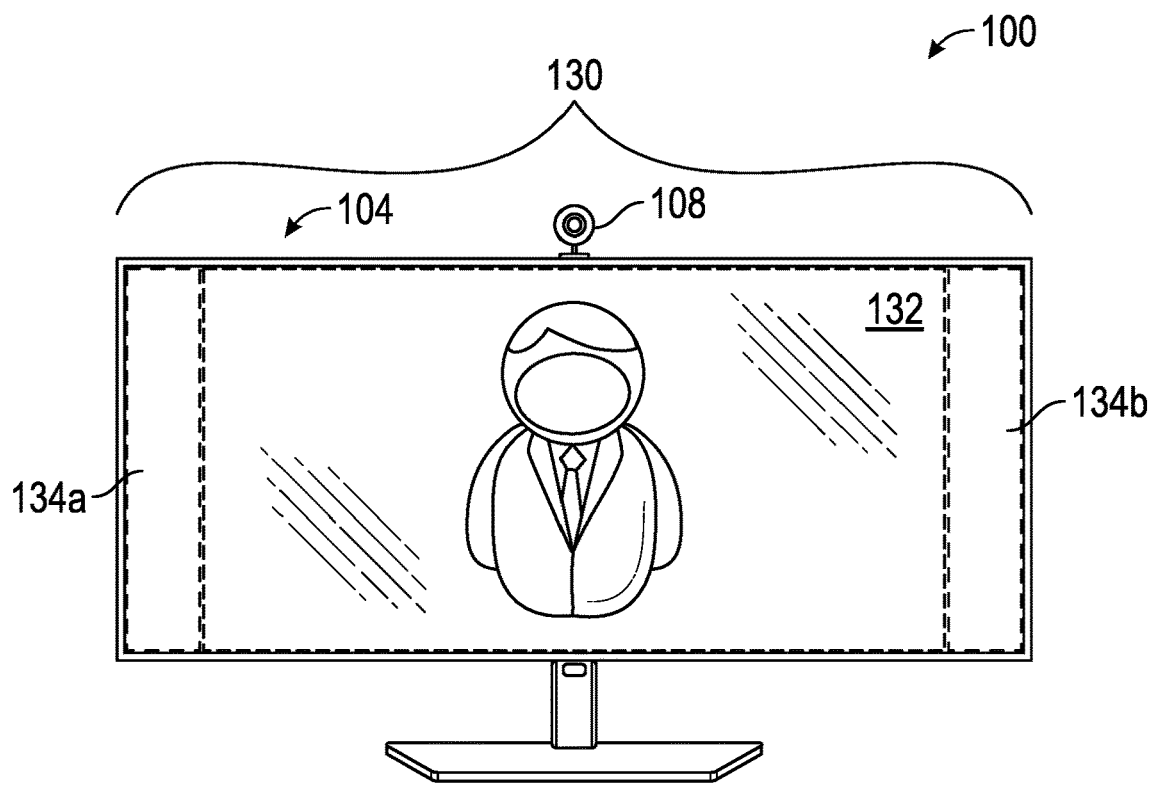
Figure 1C:
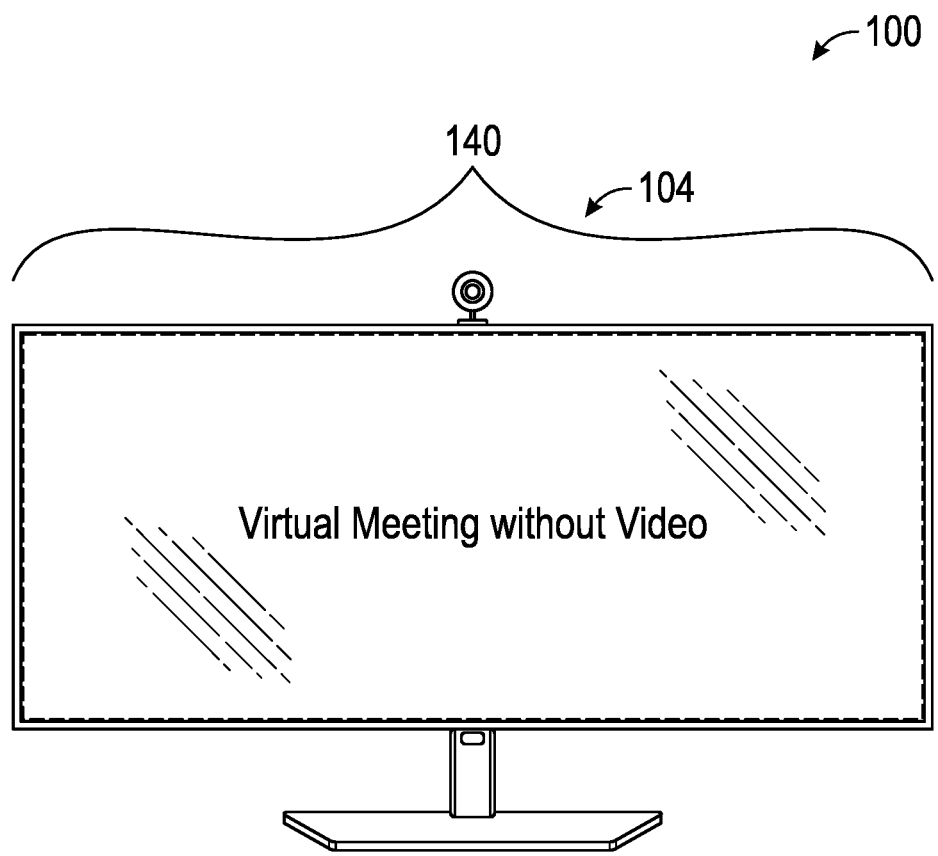

FIGS. 1A, 1B, and 1C illustrate an example fill light generating system 100 according to one embodiment of the present disclosure. The system 100 includes an Information Handling System (IHS) 102 having a display 104 for displaying images for a user 106, and a camera 108 for generating images of the user 106 while positioned in front of the display 104. The display 104 generates a light output 110 that increases the overall illuminance of the user 106 positioned in front of the display 104. The camera 108 generates images with a field-of-view (FOV) 112 that may be used by various camera-based video applications, such as videoconferencing, vlogging apps, and the like. As will be described in detail herein below, the IHS 102 includes executable logic for manipulating the light output 110 of the display 104 so that the user's overall illuminance is increased.

The fill light generating system 100 may include computer-executable instructions that are stored in a memory and executed on one or more processors of the IHS 102 to perform the various features described herein. In one embodiment, the fill light generating system 100 comprises a portion of a display manager application that is executed on an IHS, such as IHS 102, and is configured to manage the settings and corresponding adjustments to the various features of a display, such as display 104, coupled to the IHS. One example of such a display manager application may include at least a portion of a Dell Display Manager (DDM) available from DELL TECHNOLOGIES. The Dell Display Manager enhances everyday productivity through comprehensive management tools that are available from the IHS 102, which provide optimal front of screen experience, efficient display management, and easy, effortless multitasking. Using the Dell Display Manager, users may be enabled to manage and control displays remotely from where the display is located. In general, the display manager may be used to adjust or update the fill light region 134a-b using an OSD user interface from the IHS 102.

FIGS. 1B and 1C illustrate how the system 100 may be used to manipulate the light output 110 of the display 104 for enhancing the overall illuminance of the user 106 according to one embodiment of the present disclosure. In particular, FIG. 1B illustrates a screen 130 that may be generated by the system 100 when a camera-based video application is currently being executed, while FIG. 1C shows the screen 140 when no camera-based video application is currently being used. As will be described in detail herein below, the IHS 102 includes executable logic for generating an image on the display 104, the image comprising a first region and a second region, the first region configured to display a second video feed signal from the IHS, the second region configured to generate fill light for enhancing a luminescence of the user.

When the camera-based video application is currently being executed, as shown in FIG. 1B, the system 100 generates an image on the screen 130 with a video feed signal region 132 and a fill light region 134a-b (collective 134). The video feed signal region 132 generally includes images that may be normally generated on the display 104 by the IHS 102. For example, the system 100 may display the video output of a camera-based video application, such as videoconferencing application in the video feed signal region 132. The fill light region 134, however, is generated by the system 100 to produce fill light for enhancing the illuminance of the user 106. For example, the fill light region 134 may generate a white light, or other color light, which may be controlled by the system 100 to increase the overall light output generated by the display 104. It should be appreciated that the system 100 may generate a third video feed signal to another IHS via a communication network, such as the Internet. For example, the third video feed signal may be generated by a teleconferencing application that generates the third video feed signal to be sent to a remotely configured display.

FIG. 1C shows a screen 140 that may be generated when no camera-based video application is being used by the IHS 102. In particular, the screen 140 is sized to encompass the entire output of the display 104 in which the fill light region 134a-b has been turned off. That is, the system 100 is configured to turn on the fill light region 134a-b when a camera-based video application is currently being used by the IHS 102, and turn it off otherwise. In one embodiment, the system 100 may be responsive to sensors configured on the IHS 102 for detecting when the camera is turned on to, without user input, begin generating the fill light region 134a-b on the display 104 and turning off the fill light region 134a-b when the camera-based video application is no longer being used.

In one embodiment, the system 100 may be configured to adjust a level of light output generated by the fill light region 134a-b. For example, the system 100 may include executable logic for receiving user input to adjust a level of light generated by the fill light region 134a-b. In one embodiment, the user input may be received and processed using a scalar component 116 configured in the display 104. (See FIG. 1A). Such an embodiment using the scalar component 116 of the display 104 may provide an advantage in that the IHS 102 may be alleviated of the burden of performing the tasks of receiving and processing user input for manipulating the display 104. Furthermore, the scalar component 116 is ideally suited to perform such tasks given that it also handles other video processing functions for the display 104.

In one embodiment, the system 100 may receive the user input for adjusting the light output of the fill light region 134a-b via an On Screen Display (OSD) component of the display 104. An OSD generally refers to an image superimposed on a screen, commonly used by current displays for displaying and receiving user input for adjusting those settings. Interaction with a display is typically accomplished with the OSD using physical buttons configured on the display and/or executable software that manages the operation of the OSD and thus the display. The OSD of the display 104 may include logic for displaying settings for adjusting the fill light region 134a-b.

Figure 2A:
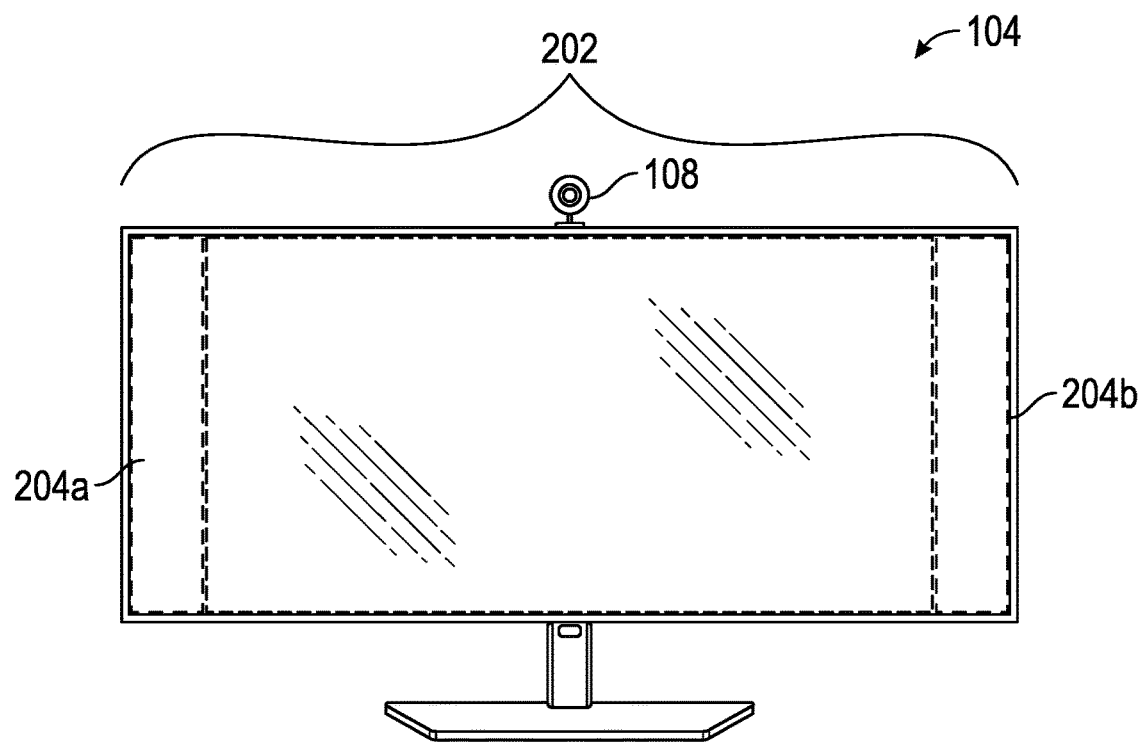
FIGS. 2A through 2D illustrate other example screens that may be generated by the fill light system according to one embodiment of the present disclosure.
Figure 2B:
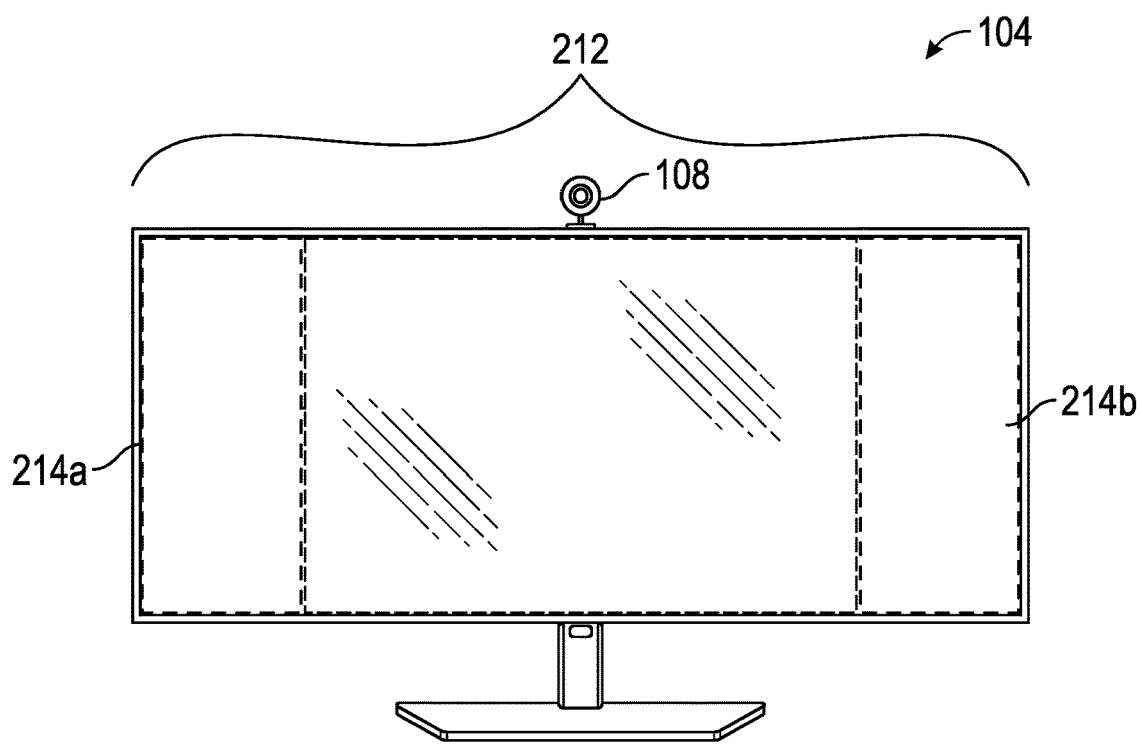
Figure 2C:
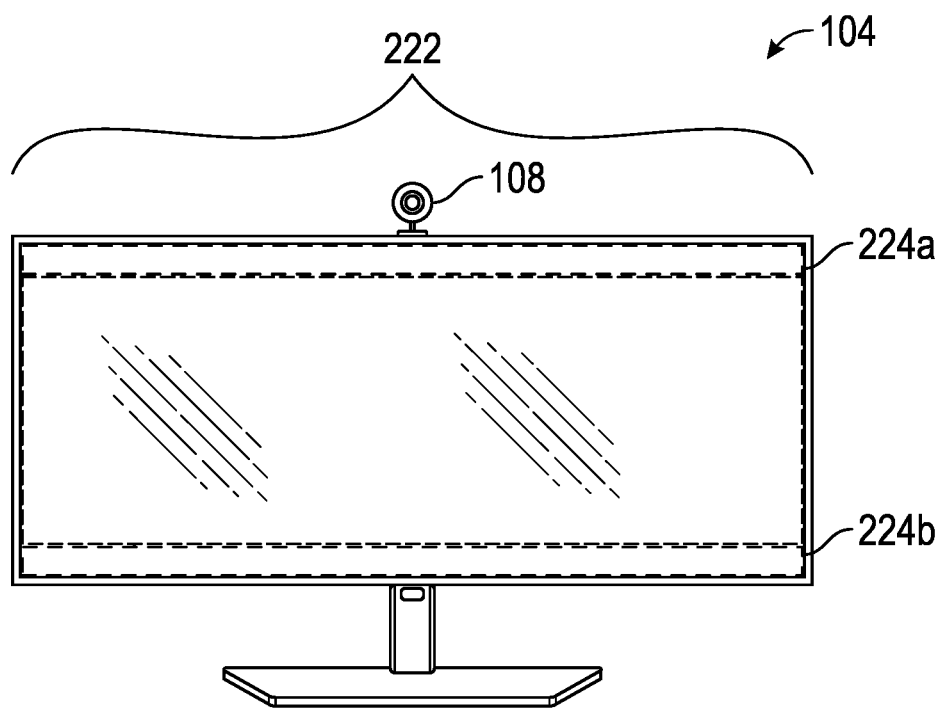
Figure 2D:
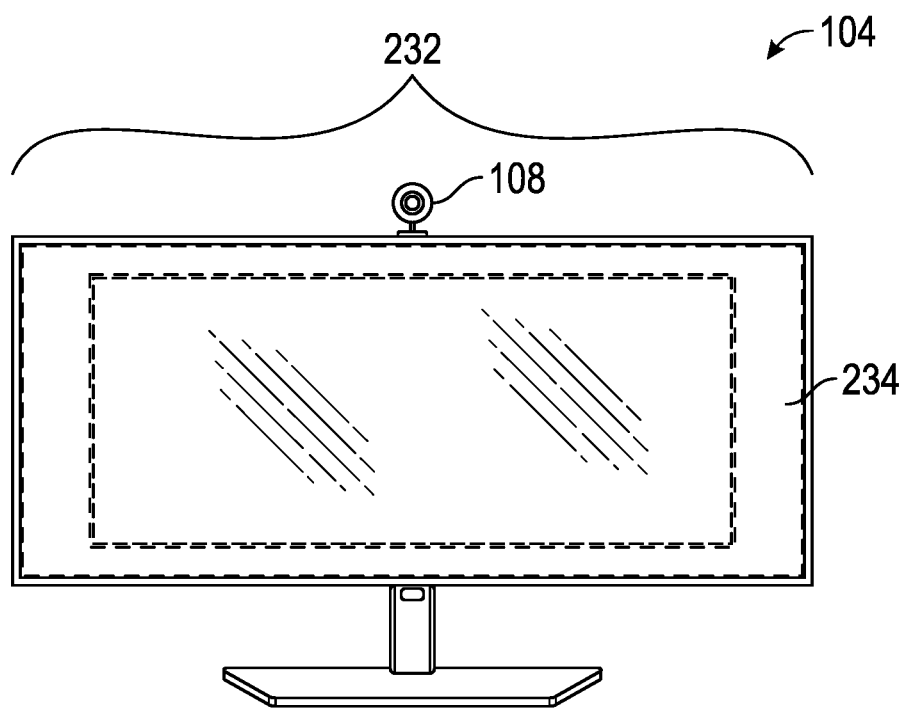

FIGS. 2A through 2D illustrate other example screens 202, 212, 222, and 232 that may be generated by the fill light system according to one embodiment of the present disclosure. In particular, FIG. 2A illustrates a screen 202 with a fill light region 204a-b, FIG. 2B illustrates a screen 212 with a fill light region 214a-b, FIG. 2C illustrates a screen 222 with a fill light region 224a-b, while FIG. 2D illustrates a screen 232 with a fill light region 234 that may each be alternatively generated on the display 104. For example each of the screens 202, 212, 222, and 232 may be alternatively selected according to user input received from the user 106, such as via the OSD of the display 104.

The screens 202, 212 of FIGS. 2A and 2B, respectively, show how their respective fill light region 204a-b and 214a-b may be adjusted in size for various reasons including the adjustment of the overall brightness generated by the display 104. The system 100, for example, may receive user input for adjusting a brightness level of the fill light region 204a-b by proportionally adjusting its size to be that of fill light region 214a-b of FIG. 2B. The system 100 may also adjust the overall brightness level of the fill light region 204a-b by increasing its light intensity level without regard for the current size of the fill light region 204a-b. Thus, the system 100 may include a setting for adjusting a light intensity level generated by the fill light region 204a-b as well as a size of the fill light region 204a-b that also serves to adjust the overall illuminance generated on the user 106 by the fill light region 204a-b.

Another example setting may include whether or not the system 100 automatically adjusts the brightness level of the fill light region (134a-b, 204a-b, 214a-b, 224a-b, and 234). For example, the system 100 may receive input from a light sensor configured on the IHS 102 to, based on existing ambient light levels, increase or decrease the brightness level of the fill light region (134a-b, 204a-b, 214a-b, 224a-b, and 234). For another example, the system 100 may process the video feed signal obtained from the camera 108 to determine whether the images are sufficiently illuminated and increase or decrease the brightness level of the fill light region (134a-b, 204a-b, 214a-b, 224a-b, and 234) to compensate for the ambient lighting conditions.

Referring now to FIG. 2C, the screen 222 includes fill light regions 224a-b that extend along the upper and lower perimeter of the screen 222. Whereas the fill light regions 204a-b and 214a-b of FIGS. 2A and 2B may be useful for providing fill light on the left and right side of the user 106, the fill light region 224a-b of FIG. 2C may be useful for providing fill light on the upper and lower portions of the user 106.

In one embodiment, the fill light regions 204a-b of FIG. 2A and the fill light regions 224a-b of FIG. 2C may be adjusted by the system 100 to select a desired fill ratio for the user 106. Within this disclosure, a fill ratio generally refers to an amount of off-incident (fill) light that may be added to reduce or increase contrast imparted by ambient light. Thus, by adjusting the overall light outputted by the fill light regions (204a-b, 214a-b) of FIGS. 2A and 2B, the fill ratio on the left and right side of the user 106 may be adjusted. Similarly, by adjusting the overall light outputted by the fill light region 224a-b as shown in FIG. 2C, the fill ratio on the upper and lower portions of the user 106 may be adjusted.

In another embodiment, the system 100 may independently adjust either the left fill light region 204a or the right fill light region 204b as in the screen 202 of FIG. 2A, or the upper fill light region 224a or the lower fill light region 224b as in the screen 222 of FIG. 2C. For example, the system 100 may adjust the intensity of the light emitted by the left fill light region 204a to be 80.0 percent (%) of its maximum brightness, while adjusting the intensity of the light emitted by the right fill light region 204b to be 20.0% of its maximum brightness. Such a feature may be useful for imparting a shading effect on the right side of the generated image of the user 106. Similar shading effects may be produced on the left side, upper side, and lower side of the image by independently adjusting the fill light regions 204a-b or 224a-b.

In another embodiment, the system 100 may independently adjust a color or hue generated by either of the fill light regions (134a-b, 204a-b, 214a-b, 224a-b, and 234). For example, the system 100 may generate light having a partially red tone in one or more fill light regions to increase the warmth of the image of the user 106. Conversely, the system 100 may generate light having a partially blue tone in one or more fill light regions to increase the coolness of the image of the user 106.

Referring now to FIG. 2D, the screen 232 includes a single fill light region 234 that extends along the outer periphery of the screen 232. Such a fill light region 234 may be selected for various reasons, such as one in which the user 106 desires to impart a neutral fill ratio around the entire periphery of the user 106. Other example settings that may be adjusted by the OSD of the display 104 will be described in detail herein below.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 3:
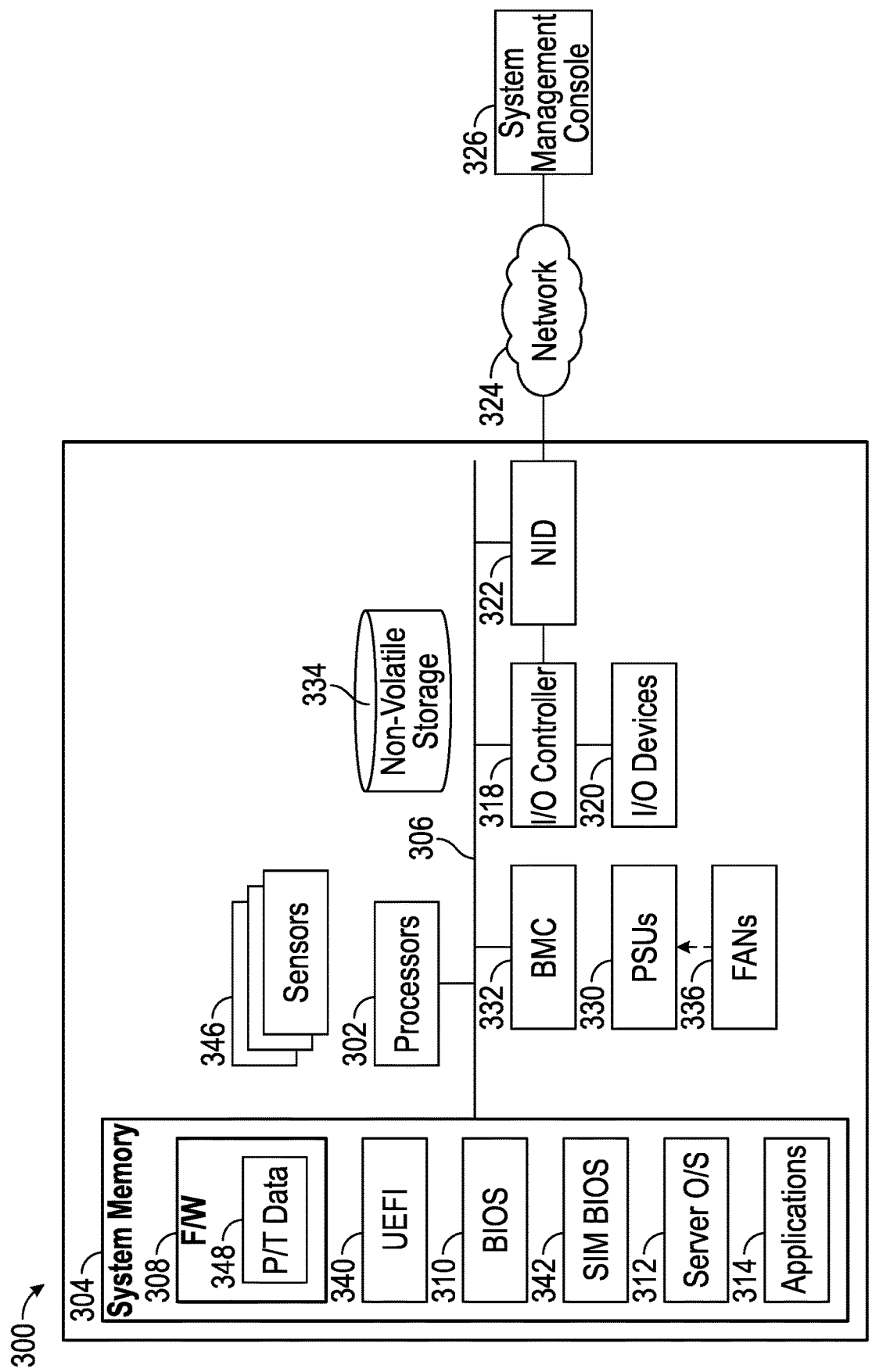
FIG. 3 is a block diagram of several components of an example IHS according to one embodiment of the present disclosure.

FIG. 3 is a block diagram of examples of components of an Information Handling System (IHS) 300 that may be used to implement a secure storage unit replacement and locking system and method according to one embodiment of the present disclosure. Particularly, IHS 300 includes one or more processor(s) 302 coupled to system memory 304 via system interconnect 306. System interconnect 306 may include any suitable system bus. System memory 304 may include a plurality of software and/or firmware modules including firmware (F/W) 308, basic input/output system (BIOS) 310, operating system (O/S) 312, and/or application(s) 314. Software and/or firmware module(s) stored within system memory 304 may be loaded into processor(s) 302 and executed during operation of IHS 300.

F/W 308 may include a power/thermal profile data table 348 that is used to store power profile data and thermal profile data for certain hardware devices (e.g., processor(s) 302, system memory 304, non-volatile storage 334, NID 322, I/O controllers 318, etc.). System memory 304 may include a UEFI interface 340 and/or a SMBIOS interface 342 for accessing the BIOS as well as updating BIOS 310. In general, UEFI interface 340 provides a software interface between an operating system and BIOS 310. In many cases, UEFI interface 340 can support remote diagnostics and repair of computers, even with no operating system installed. SMBIOS interface 342 can be used to read management information produced by BIOS 310 of an IHS 300. This feature can eliminate the need for the operating system to probe hardware directly to discover what devices are present in the computer.

IHS 300 includes one or more input/output (I/O) controllers 318 which manages the operation of one or more connected input/output (I/O) device(s) 320, such as a keyboard, mouse, touch screen, microphone, a monitor or display device, a camera, a microphone, audio speaker(s) (not shown), an optical reader, a universal serial bus (USB), a card reader, Personal Computer Memory Card International Association (PCMCIA) slot, and/or a high-definition multimedia interface (HDMI), which may be included or coupled to IHS 300.

IHS 300 includes Network Interface Device (NID) 322. NID 322 enables IHS 300 to communicate and/or interface with other devices, services, and components that are located externally to IHS 300. These devices, services, and components, such as a system management console 326, can interface with IHS 300 via an external network, such as network 324, which may include a local area network, wide area network, personal area network, the Internet, etc.

For the purposes of this disclosure, the term "system management console" may refer broadly to systems that are configured to couple to a management controller and issue management instructions for an information handling system (e.g., computing device) that is being managed by the management controller. One example of such a system management console is the Dell OpenManage Enterprise (OME) systems management console. In various embodiments, management consoles may be implemented via specialized hardware and/or via software running on a standard information handling system. In one embodiment, a system management console may be deployed on a secure virtual machine (VM), such as a VMWARE Workstation appliance.

IHS 300 further includes one or more power supply units (PSUs) 330. PSUs 330 are coupled to a BMC 332 via an I²C bus. BMC 332 enables remote operation control of PSUs 330 and other components within IHS 300. PSUs 330 power the hardware devices of IHS 300 (e.g., processor(s) 302, system memory 304, non-volatile storage 334, NID 322, I/O controllers 318, etc.). To assist with maintaining temperatures within specifications, an active cooling system, such as one or more fans 336 may be utilized.

IHS 300 further includes one or more sensors 346. Sensors 346 may, for instance, include a thermal sensor that is in thermal communication with certain hardware devices that generate relatively large amounts of heat, such as processors 302 or PSUs 330. Sensors 346 may also include voltage sensors that communicate signals to BMC 332 associated with, for example, an electrical voltage or current at an input line of PSU 330, and/or an electrical voltage or current at an output line of PSU 330.

BMC 332 may be configured to provide out-of-band management facilities for IHS 300. Management operations may be performed by BMC 332 even if IHS 300 is powered off, or powered down to a standby state. BMC 332 may include a processor, memory, and an out-of-band network interface separate from and physically isolated from an in-band network interface of IHS 300, and/or other embedded resources.

In certain embodiments, BMC 332 may include or may be part of a Remote Access Controller (e.g., a DELL Remote Access Controller (DRAC) or an Integrated DRAC (iDRAC)). In other embodiments, BMC 332 may include or may be an integral part of a Chassis Management Controller (CMC).

Figure 4:
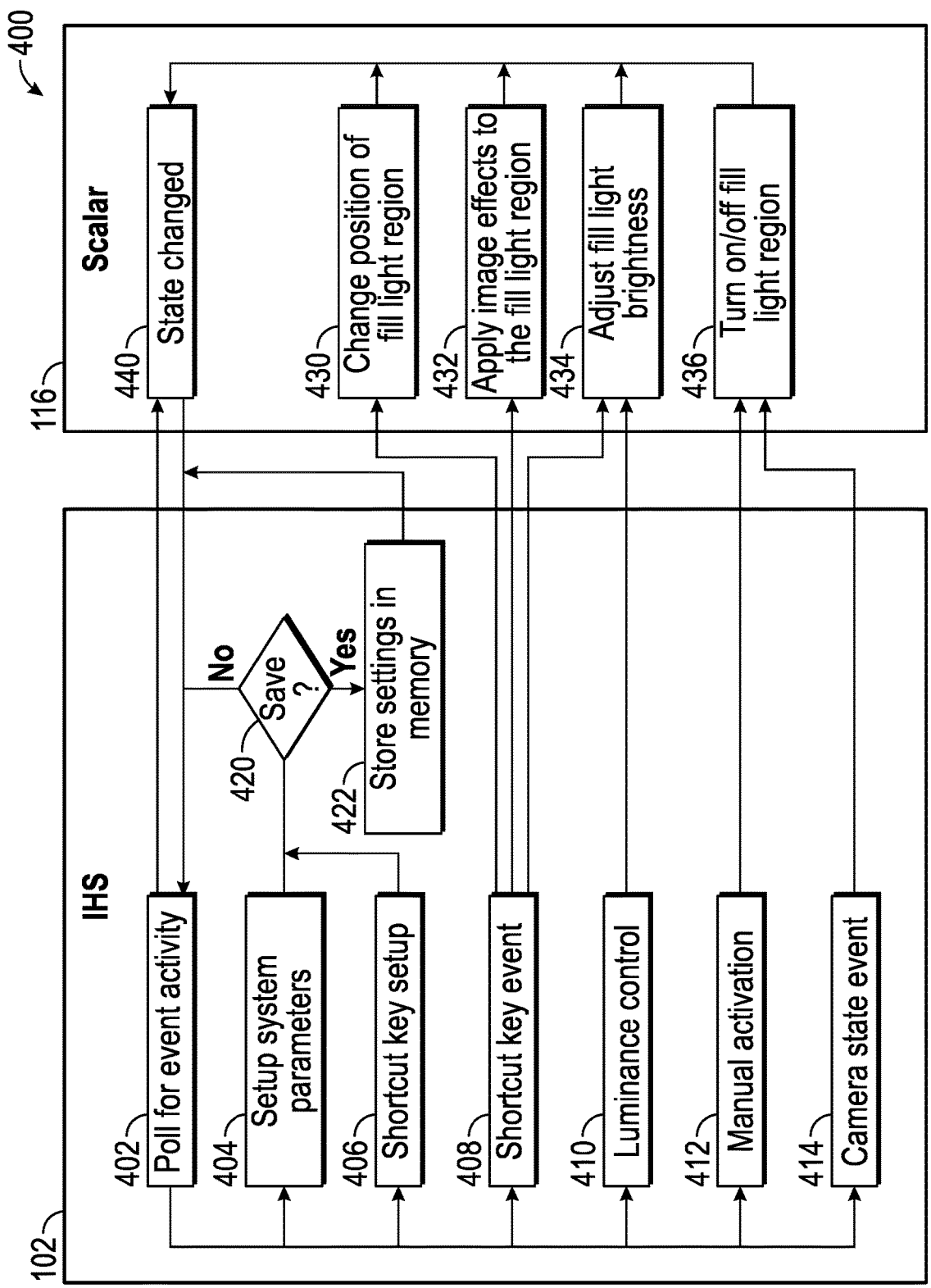
FIG. 4 illustrates an example fill light generating method that may be performed to generate a fill light region on a display according to one embodiment of the present disclosure.

FIG. 4 illustrates an example fill light generating method 400 that may be performed to generate a fill light region on a display according to one embodiment of the present disclosure. In some embodiments, at least a portion of the steps of the method 400 may be performed by the system 100 of FIG. 1A. In general, steps 402-422 may be performed by instructions stored and executed in the IHS 102, while steps 430-436 are performed by the scalar component 116 configured in the display 104. Nevertheless in other embodiments, some, most, or all steps may be performed by either of the IHS 102 and/or scalar component 116 of the display 104 without departing from the spirit and scope of the present disclosure.

Initially at step 402, the method 400 polls for event activity. That is, instructions to perform either of steps 404, 406, 408, 410, 412, or 414 when an event is detected by the system. For example, certain hot keys may be established, which may be used to access either of the steps 404, 406, 408, 410, 412, and 414 described herein. The hot keys may be provided to the user as default values, while certain of those hot keys may be configurable by the user to according to the user's tastes as will be described in detail herein below.

Figure 5A:
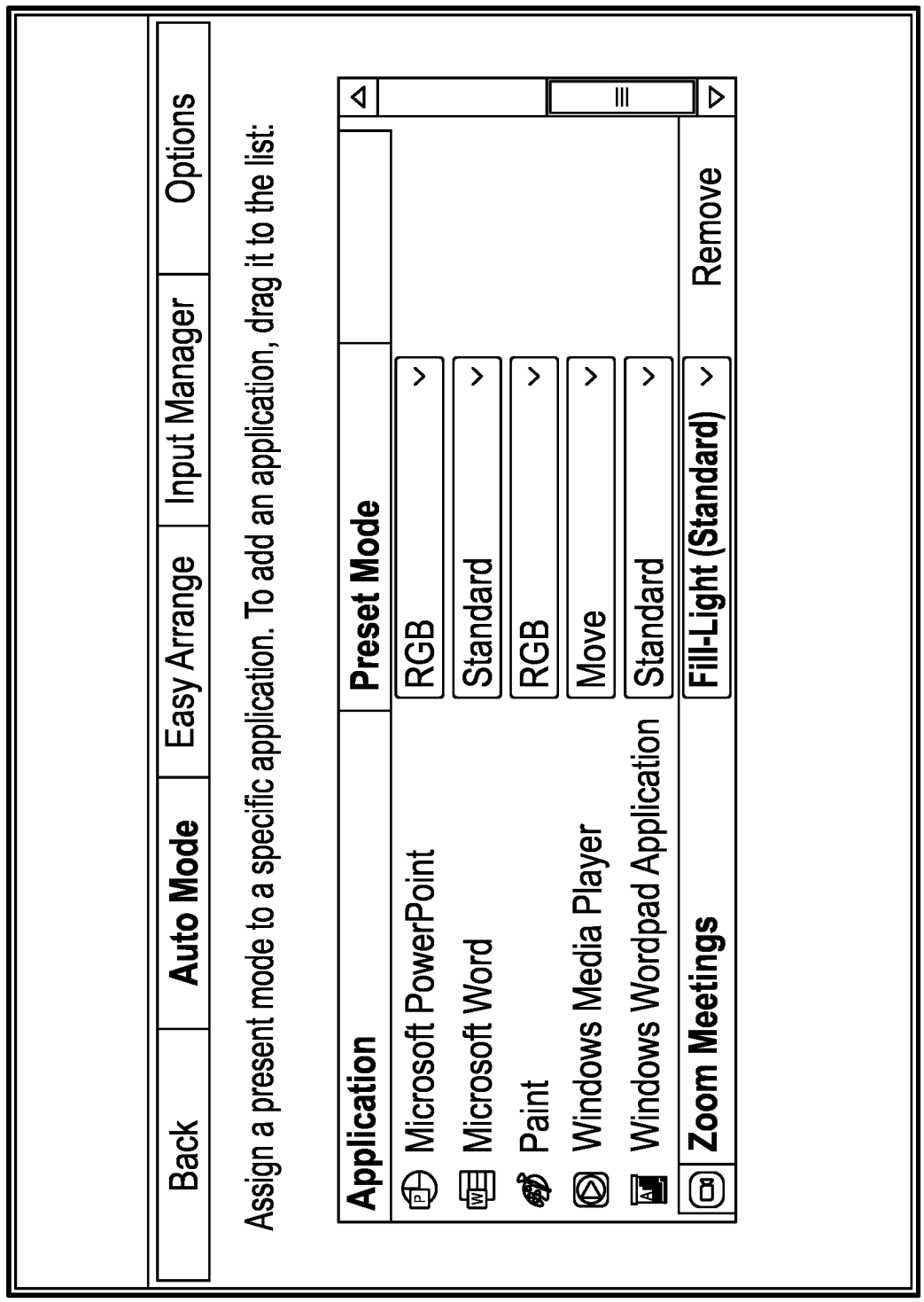

At step 404, the method 400 performs a setup system parameters process that allows the user to adjust certain settings of the fill light generating system. For example, step 404 may be used to adjust certain settings, such as those described above with reference to FIGS. 1B, 1C, and 2A through 2D. In one embodiment, the settings may be obtained via an interactive OSD interface generated on the display 104. In another embodiment, the method 400 may provide for certain settings to be applied based upon a type of application that is in the foreground of the display 104. For example, FIG. 5A illustrates an example preset mapping setup screen 502 that may be used to record the fill light generating system settings that may be applied for each of multiple applications.

When step 404 is completed, the method 400 determines whether any selected keys are to be saved at step 420. For example, the method 400 may generate an interactive pop-up box on the display 104 requesting user input for identifying if any adjusted shortcut keys are to be saved. If so, processing continues at step 422 to save any modified shortcut key settings in a non-volatile memory of the IHS 102, and then to step 402 to continue polling for event activity.

When step 422 is completed, processing continues at step 402 to again poll for event activity from the system. At step 406, the method 400 performs a shortcut key setup process, which allows the user to customize certain hot keys used by the system, and to select whether or not certain events are to be acted upon. For example, the method may provide a user selectable button that may be controlled by the user for determining whether to change the image effects to the fill light region, or to change the position of the fill light region. That is, when the camera is detected, it may trigger the fill light event whereby the application will send a command to the monitor to turn on the fill light region. When camera is turned off, the signal is lost, and the application will turn off the fill light. The detection of the presence/absent of camera can be offered to user as an auto detection option. In a particular example, FIG. 5B illustrates an example shortcut key setup screen 510 that may be used to receive user input for selecting customized hot keys for certain events, and determining whether certain events are to be acted upon.

When step 406 is completed, the method 400 determines whether any selected keys are to be saved at step 420. For example, the method 400 may generate an interactive pop-up box on the display 104 requesting user input for identifying if any adjusted shortcut keys are to be saved. If so, processing continues at step 422 to save any modified shortcut key settings in a non-volatile memory of the IHS 102, and then to step 402 to continue polling for event activity.

At step 408, the method 400 responds to a shortcut key event that has occurred in the IHS 102. For example, if the shortcut key event is associated with a change to a position of the fill light region, the method 400 may communicate with the scalar component 116 to change the position of the fill light region at step 430, if the shortcut key event is associated with a change to one or more image effect(s) of the fill light region, the method 400 may communicate with the scalar component 116 to apply the image effects to the fill light region at step 432, and if the shortcut key event is associated with a change to a brightness level of the fill light region, the method 400 may communicate with the scalar component 116 to change the brightness level of the fill light region at step 434. When either of steps 430, 432, or 434 has been performed, a state change to the monitor occurs at step 440 in which the scalar updates the State Changed Field with the changes. The DDM may also poll the State Changed Field to get the monitor changes and synchronize with the DDM state. Thereafter, processing continues at step 402 to continue polling or listening for other event activity.

At step 410, the method 400 responds to another shortcut key to manually adjust a brightness of the fill light region. For example, the method 400 upon detecting a shortcut key associated with a brightness setting, may display an interactive element, such as a slider bar, to receive user selection of a particular brightness setting to be applied to the fill light region. When the method 400 receives selection of a brightness setting from the user, it may then communicate with the scalar component 116 to change the brightness level of the fill light region at step 434.

At step 412, the method 400 responds to another shortcut key to manually activate or de-activate the fill light region. For example, the method 400 upon detecting a shortcut key associated with activation or de-activation of the fill light region, it may communicate with the scalar component 116 to activate or de-activate the fill light region at step 436.

At step 414, the method 400 responds to a camera state event to determine that it has changed state (e.g., off-to-on, on-to-off), and communicate with the scalar component 116 to activate or de-activate the fill light region based on the determination at step 436.

The method 400 may be continually performed during the operation of the IHS 102 for activating and de-activating the fill light region for enhancing an overall illuminance imparted onto a user positioned in front of the display 104. Nevertheless, when use of the fill light generating method 400 is no longer needed or desired, the method 400 ends.

Although FIG. 4 describes an example method 400 that may be performed to generate a fill light region on a display, the features of the method 400 may be embodied in other specific forms without deviating from the spirit and scope of the present disclosure. For example, the method 400 may perform additional, fewer, or different operations than those described in the present examples. As another example, certain steps of the aforedescribed method 400 may be performed in a sequence different from that described above. As yet another example, certain steps of the method 400 may be performed by other components in the IHS 102 other than those described above.

FIGS. 5A and 5B illustrate two example user input screens that may be generated by the fill light generating system to receive user input for adjusting how the fill light regions are displayed on the display. In particular, FIG. 5A illustrates an example preset mapping setup screen 502 that may be used to record the fill light generating system settings that may be applied for each of multiple applications, while FIG. 5B illustrates an example shortcut key setup screen 510 that may be used to receive user input for selecting customized hot keys for certain events, and determining whether certain events are to be acted upon.

Referring to FIG. 5B, the shortcut key setup screen 510 includes, among other things, a fill light region brightness shortcut key 512, a fill light region position shortcut key 514, and a fill light region effect shortcut key 516. The fill light region brightness shortcut key 512 may be used to obtain user selection of a particular hot key that when selected, generates another user interface element (e.g., a slider bar) for receiving user selection of a particular brightness setting for the fill light region.

The fill light region position shortcut key 514 may be used to obtain user selection of a particular hot key that when selected, cycles through the various active regions, such as left/right fill light regions 204a-b and 214a-b (FIGS. 2A and 2B), upper/lower fill light regions 224a-b (FIG. 2C), or outer periphery fill light region 234 (FIG. 2D) setting for the fill light region. The fill light region effect shortcut key 516 may be used to obtain user selection of a particular hot key that when selected, cycles through the various supported effects (e.g., shading effect, color enhancing effect) that can be applied to the fill light region, such as described above with reference to FIGS. 2A-2D.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) comprising:
   a display;
   a camera configured to generate a first video feed signal of a user positioned in front of the display; and
   instructions stored in at least one memory and executed by at least one processor, wherein the instructions, upon execution, cause the IHS to:
   generate an image on the display, the image comprising a first region and a second region, the first region configured to display a second video feed signal from the IHS, the second region configured to generate fill light for enhancing a luminescence of the user;
   monitor a status of the camera;
   when the camera is turned on, generate the first and second regions on the display; and
   when the camera is turned off, generate only the first region on the display.

2. The IHS of claim 1, wherein the instructions, upon execution, further cause the IHS to receive user input for adjusting a color of the fill light.

3. The IHS of claim 1, wherein the instructions, upon execution, further cause the IHS to receive user input for adjusting a position of the second region on the display.

4. The IHS of claim 3, wherein the instructions, upon execution, further cause the IHS to receive the user input for adjusting at least one of an upper or lower fill ratio of the user, wherein the second region comprises an upper sub-region configured proximate a top of the image and a lower sub-region configured proximate a bottom of the image.

5. The IHS of claim 3, wherein the instructions, upon execution, further cause the ITIS to receive the user input for adjusting at least one of a right side or left side fill ratio of the user, wherein the second region comprises a left side sub-region configured proximate a left side of the image and a right side sub-region configured proximate a right side of the image.

6. The IHS of claim 3, wherein the instructions, upon execution, further cause the IHS to receive the user input for adjusting a neutral fill ratio of the user, wherein the second region encompasses the first region on the image.

7. The IHS of claim 3, wherein the instructions, upon execution, further cause the IHS to receive the user input for adjusting an amount of the fill light by increasing or decreasing a size of the second region relative to the size of the first region on the image.

8. The IHS of claim 1, wherein the first video feed signal is at least partly generated by at least one of a videoconference, and a virtual logger application, and wherein the instructions, upon execution, further cause the IHS to generate a third video feed signal to another display through a communication network.

9. The IHS of claim 1, wherein at least a portion of the instructions are executed by a scalar device configured in the display.

10. The IRS of claim 9, wherein the instructions, upon execution, further cause the IRS to receive user input for adjusting the luminescence of the second region using an On Screen Display (OSD) generated by the scalar.

11. A fill light generating method comprising:
    generating, using a camera configured on a display of an Information Handling System (IHS), a first video feed signal of a user positioned in front of the display;
    generating an image on the display, the image comprising a first region and a second region, the first region displaying a second video feed signal from the IHS, the second region generating fill light for enhancing a luminescence of the user:
    monitoring a status of the camera;
    when the camera is turned on, generating the first and second regions on the display; and
    when the camera is turned off, generating only the first region on the display.

12. The fill light generating method of claim 11, further comprising receiving user input for adjusting a color of the fill light.

13. The fill light generating method of claim 11, further comprising receiving user input for adjusting a position of the second region on the display.

14. The fill light generating method of claim 13, further comprising receiving the user input for adjusting at least one of an upper or lower fill ratio of the user, wherein the second region comprises an upper sub-region configured proximate a top of the image and a lower sub-region configured proximate a bottom of the image.

15. The fill light generating method of claim 13, further comprising receiving the user input for adjusting at least one of a right side or left side fill ratio of the user, wherein the second region comprises a left side sub-region configured proximate a left side of the image and a right side sub-region configured proximate a right side of the image.

16. The fill light generating method of claim 13, further comprising receiving the user input for adjusting a neutral fill ratio of the user, wherein the second region encompasses the first region on the image.

17. The fill light generating method of claim 13, further comprising receiving the user input for adjusting an amount of the fill light by increasing or decreasing a size of the second region relative to the size of the first region on the image.

18. A hardware memory device having program instructions stored thereon that, upon execution by a processor of an information Handling System (IHS), cause the IHS to:
  generate, using a camera configured on a display of an Information Handling System (IHS), a first video feed signal of a user positioned in front of the display;
  generate an image on a display of an Information Handling System (IHS), the image comprising a first region and a second region, the first region configured to display a second video feed signal from the IHS, the second region configured to generate fill light for enhancing a luminescence of the user;
  monitor a status of the camera;
  when the camera is turned on, generate the first and second regions on the display; and
  when the camera is turned off, generate only the first region on the display.

\* \* \* \* \*

UNITED STATES PATENT AND TRADEMARK OFFICE
CERTIFICATE OF CORRECTION

| | |
|---|---|
| PATENT NO. | : 11,930,279 B2 |
| APPLICATION NO. | : 17/650736 |
| DATED | : March 12, 2024 |
| INVENTOR(S) | : Eng Cheng Vincent Yap, Lei Guo and Bee June Tye |

It is certified that error appears in the above-identified patent and that said Letters Patent is hereby corrected as shown below:

In the Claims

In Column 11 Line 66, Claim 5, delete "execution, further cause the ITIS to receive the user input for" and insert --execution, further cause the IHS to receive the user input for-- therefor.

In Column 12 Lines 23 and 24, Claim 10, delete "The IRS of claim 9, wherein the instructions, upon execution, further cause the IRS tor eceive user input for" and insert --The IHS of claim 9, wherein the instructions, upon execution, further cause the IHS to receive user input for-- therefor.

In Column 13 Line 3, Claim 18, delete "an information Handling System (IHS), cause the IHS to:" and insert --an Information Handling System (IHS), cause the IHS to:-- therefor.

Signed and Sealed this
Twenty-first Day of May, 2024

*Katherine Kelly Vidal*

Katherine Kelly Vidal
*Director of the United States Patent and Trademark Office*